United States Patent [19]

Castello Da Costa et al.

[11] Patent Number: 5,740,256
[45] Date of Patent: Apr. 14, 1998

[54] ADAPTIVE NOISE CANCELLING ARRANGEMENT, A NOISE REDUCTION SYSTEM AND A TRANSCEIVER

[75] Inventors: Paulo M. Castello Da Costa; Cornelis P. Janse; Patrick A. A. Timmermans, all of Eindhoven, Netherlands

[73] Assignee: U.S. Philips Corporation, New York, N.Y.

[21] Appl. No.: 762,682

[22] Filed: Dec. 11, 1996

[30] Foreign Application Priority Data

Dec. 15, 1995 [EP] European Pat. Off. ............. 95203507

[51] Int. Cl.[6] .............................................. H04B 15/00
[52] U.S. Cl. ................................. 361/94.7; 455/570
[58] Field of Search .............. 381/94.7, 66; 379/388, 379/410; 455/569, 570

[56] References Cited

U.S. PATENT DOCUMENTS

| | | | |
|---|---|---|---|
| 5,033,082 | 7/1991 | Eriksson et al. | 381/94.7 |
| 5,473,701 | 12/1995 | Cezanne et al. | 381/94.7 |
| 5,581,495 | 12/1996 | Adrins et al. | 381/94.7 |

FOREIGN PATENT DOCUMENTS

WO9516259  6/1995  WIPO.

*Primary Examiner*—Forester W. Isen
*Attorney, Agent, or Firm*—Edward W. Goodman

[57] ABSTRACT

A known cross-coupled adaptive noise cancelling arrangement uses an adaptive noise filter and an adaptive cross-talk filter in a feedback loop for cancelling correlated noise at a primary signal input and reference input. This known cross-coupled ANC does not operate satisfactorily, particularly not for acoustic noise cancellation. This leads to reverberant-like sound signals, in particular in a typical office room with remote noise sources. A different configuration of a cross-coupled adaptive noise cancelling arrangement gives rise to a better performance. The adaptive cross-talk filter is now split into a pre-filter section and an adaptive filter section, the sections using different input signals. The pre-filter section estimates the desired signal from the input signal of the noise cancelling arrangement, and the adaptive filter section has its input coupled to the output of the noise cancelling arrangement, a delay section being provided between the input and the output of the noise cancelling arrangement. In an embodiment, the pre-filter section and the adaptive filter section are separate filters.

10 Claims, 7 Drawing Sheets

ADAPTIVE NOISE CANCELLING ARRANGEMENT, A NOISE REDUCTION SYSTEM AND A TRANSCEIVER

BACKGROUND OF THE INVENTION

1. Field of the Invention

The present invention relates to an adaptive noise cancelling arrangement for cancelling noise in a noise disturbed signal, this arrangement comprising a primary signal input for receiving a primary signal which is disturbed with noise, at least one reference signal input, a signal output for providing a noise cancelled signal, and an adaptive noise filter having an input coupled to the reference signal input via a first subtracter, and an output coupled to a first input of a second subtracter, the primary signal input being coupled to a second input of the second subtracter, and an output of the second subtracter being coupled to the signal output, this arrangement further comprising an adaptive cross-talk filter having an input coupled to the signal output, and an output coupled to a first input of the first subtracter, the reference signal input being coupled to a second input of the first subtracter.

The present invention further relates to a noise reduction system and to a transceiver. Such a system can be an acoustic noise cancellation system, a hands-free communication system, a multimedia system, a public address system, or the like.

2. Description of The Related Art

An adaptive noise cancelling arrangement of this kind is known from the article "Performance Characteristics of a Hardware Implementation of the Cross-talk Resistant Adaptive Noise Canceller", G. Mirchandani et al., Proceedings 1986 IEEE ICASSP, Tokyo, pp. 93–96. Such an arrangement can be used for noise cancellation in, for instance, a conference system. An adaptive noise cancelling arrangement is described which uses two adaptive filters in a feedback loop implemented by means of a digital signal processor. A noise filter acts as an adaptive noise estimator for cancelling noise in a noise disturbed signal and a cross-talk filter is configured to estimate and cancel so-called cross-talk, it being assumed that noise picked up with a number of microphones is correlated. A first sampled signal, a primary signal containing a desired signal, such as a speech signal, and a noise signal, is fed to a subtracter that subtracts an estimated noise signal from the primary signal so as to cancel noise. A second sampled signal, a reference signal, containing a noise signal and, due to cross-talk, also a fraction of the speech signal, is fed to a subtracter that subtracts an estimated cross-talk signal from the reference signal so as to cancel the cross-talk signal. An output of the cross-talk subtracter is fed to an input of the noise estimator. Because of this cross-talk cancelling, the noise estimator, in principle, only estimates noise. If an input signal of the noise estimator contain cross-talk, then this would result in the desired signal being partly cancelled by itself and thus would lead to a substantial reduction in performance of the noise cancelling arrangement. If cross-talk is not perfectly cancelled, residual speech signals in the noise estimator cause a reverberation-like effect, or more generally, cause speech distortion. This reverberation-like effect is stronger when longer noise filters are applied. In an office room, a typical noise estimator would use 2048 samples at 8 kHz, i.e., a 0.25 sec window. It has been found that the described adaptive noise canceller does not perfectly cancel the distortion due to cross-talk, and further that this problem is stronger when applying more than one reference microphone and a multi-reference-input adaptive noise canceller. In a multi-reference-input adaptive noise canceller there are more degrees of freedom, i.e., filters and signals. Particularly, with relatively few noise sources, this leads to a more complete cancellation of the desired signal by itself. Conventional adaptive noise cancellers without a cross-talk estimator are even worse than the canceller described in said article of Mirchandani. In such conventional adaptive noise cancellers, a delay section is put in the feed-forward path of the canceller. This is to approximate a non-realizable non-causal filter that would lead to a theoretically optimal solution. Because of the chosen feedback two-filter structure in said article of Mirchandani, however, no such feed-forward delay may be introduced in this two-filter structure. This leads to a reduced performance of the noise cancellation. With remote noise sources, this could even lead to no noise cancellation at all. With an inferior noise cancellation, the feedback loop in the known feedback two-filter section does not operate correctly, so that in the presence of cross-talk, the reproduced speech still contains reverberation-like components.

SUMMARY OF THE INVENTION

It is an object of the present invention to provide an adaptive noise cancelling arrangement that has good cross-talk estimation and good noise estimation, in particular, in systems with more remote noise sources.

To this end, the adaptive noise cancelling arrangement, according to the present invention, is characterized in that the adaptive cross-talk filter comprises a pre-filter section for pre-filtering the primary signal and an adaptive filter section for determining coefficients of the pre-filter section, an input of the pre-filter section being coupled to the primary signal input, and an input of the adaptive filter section being coupled to the signal output, and in that the arrangement comprises a first delay section and second delay section, the first delay section being coupled between the primary signal input and the second input of the second subtracter, and the second delay section being coupled between the input of the adaptive noise filter and the adaptive cross-talk filter.

The present invention is based upon the insight that desired signal components at the signal output of the cancelling arrangement and at the primary signal input differ only by the delay caused by the delay section and that the filtering and adaptation operations of the adaptive cross-talk filter can be done using different input signals. The filtering operations, involving a pre-filtering of the noise disturbed input signal, can be done because of the fact that, apart from the delay, the desired input and output signals components of the cancelling arrangement are the same. Because the input signal cannot be used as an input for the adaptive filter section, the output signal of the cancelling arrangement is used for this purpose. Because of the chosen structure, a delay section can be used in the feed-forward path. Because of the pre-filtering and the delay, cross-talk is at least substantially, or even totally, cancelled. Although the pre-filtering influences the noise components at the input of the noise canceller, this does not cause any problem. The noise canceller can still cancel this altered noise.

In a first embodiment of an adaptive noise cancelling arrangement according to the present invention, an output of the second delay section is directly coupled to an input of the adaptive filter section of the adaptive cross-talk filter, and the adaptive filter section is arrangement for unconditional transfer of the determined coefficients to the pre-filter section. Herewith, no output signals of the adaptive filter section have to be calculated, and thus less computational effort is required.

In a second embodiment of an adaptive noise cancelling arrangement according to the present invention, the output of the second delay section is coupled to a first input of a third subtracter having a second input coupled to an output of the adaptive filter section, an output of the third subtracter being coupled to the input of the adaptive filter section, and the adaptive filter section being arranged for conditional transfer of the determined coefficients to the pre-filter section. Although this embodiment, a so-called foreground/background configuration, requires some more computational effort due to a greater complexity than the first embodiment, this embodiment also operates well for larger delay values, whereas the first embodiment may become unstable for larger delay values.

In an embodiment of the noise cancelling arrangement according to the present invention, the adaptive noise cancelling arrangement comprises more than one reference signal inputs and adaptive noise filters, of which respective inputs are coupled to the respective reference signal inputs, and an adder having respective inputs coupled to respective outputs of the adaptive noise filters, and an output coupled to the signal output, the noise cancellation arrangement having a cross-talk adaptive filter structure for respective reference signals as described above. Such a multi-reference-input configuration is particularly useful for conference systems with more remote noise sources. Then, in one embodiment, a cluster of closely-spaced directional microphones in a spatially cross-configuration can be used, and, in another embodiment, a cluster of closely-spaces microphones in a spatially linear configuration. In the latter case, the microphones are not necessarily directional and the microphone signals are pre-processed.

In hands-free telephone arrangements in a car, for instance, where also uncorrelated noise sources are present, the adaptive noise cancelling arrangement may be a series arrangement of a Zelinski noise reduction arrangement or a Zelinski-spectral subtraction noise reduction arrangement and an adaptive noise cancellation arrangement as described above. The Zelinski-spectral subtraction noise reduction arrangement is particularly useful for cancelling uncorrelated noise components.

In an embodiment of the noise reduction system according to the present invention, the adaptive noise filter has a substantial greater length than the adaptive cross-talk filter. Herewith, the system is adapted for use with the cluster of closely-spaced microphones in a conference system, cross-talk components produced by a speaker close to the microphones requiring a relatively short filter. In such systems, advantageously, the microphone for the primary signal is directed to the speaker, whereas the microphones for the reference signals are directed to the audience, remote from the speaker.

BRIEF DESCRIPTION OF THE DRAWINGS

The present invention will now be described, by way of example, with reference to the accompanying drawings, wherein.

Throughout the figures the same reference numerals are used for the same features.

DESCRIPTION OF THE PREFERRED EMBODIMENTS

Figure 1:
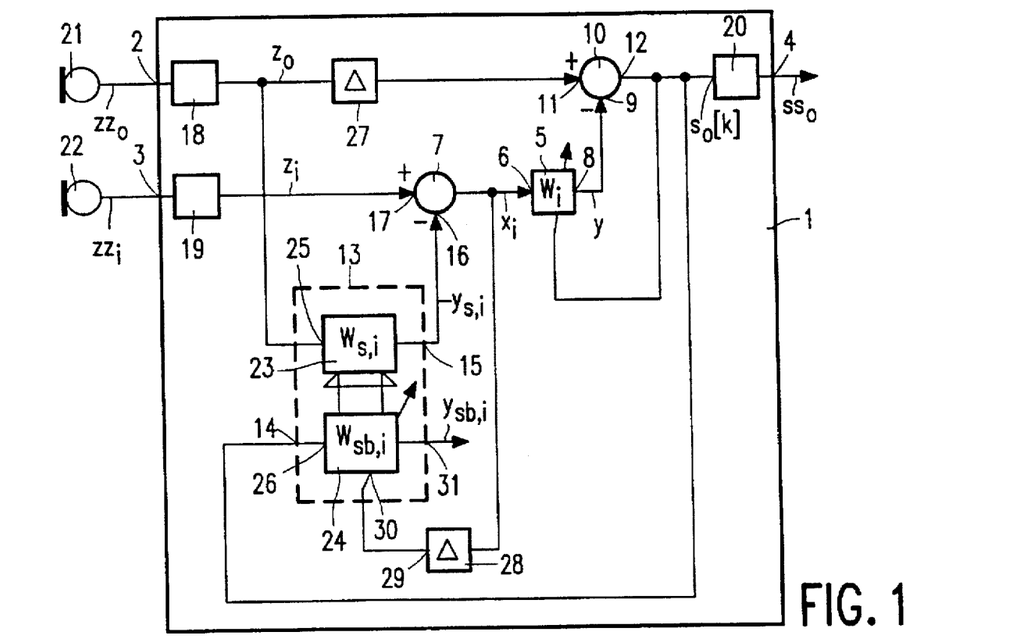
FIG. 1 shows a block diagram of a first embodiment of an adaptive noise cancelling arrangement according to the present invention.

FIG. 1 shows a block diagram of a first embodiment of an adaptive noise cancelling arrangement 1 according to the present invention comprising a primary signal input 2 for a noise disturbed analog signal $zz_0$, a reference signal input 3 for an analog reference signal $zz_i$, and a signal output 4 for a noise cancelled analog signal $ss_0$. The noise cancelling arrangement 1 comprises an adaptive noise filter 5 having an input 6 coupled to the reference signal input 3 via a first subtracter 7, and an output 8 coupled to a first input 9 of a second subtracter 10. The primary signal input 2 is coupled to a second input 11 of the second subtracter 10. An output 12 of the second subtracter 10 is coupled to the signal output 4. The noise cancelling arrangement 1 further comprises an adaptive cross-talk filter 13 having an input 14 coupled to the signal output 4, and an output 15 coupled to a first input 16 of the first subtracter 7. The reference signal input 3 is coupled to a second input 17 of the first subtracter 7. The noise disturbed analog signal $zz_0$ is sampled by means of an analog-to-digital converter 18 so as to get a noise disturbed digital signal $z_0$, and the analog reference signal $zz_i$ is sampled by means of an analog-to-digital converter 19 so as to get a digital reference signal $z_i$. The noise cancelled analog signal $ss_0$ is obtained from a noise cancelled digital signal $s_0$ by means of a digital-to-analog converter 20. This noise disturbed signal $zz_0$ can be a speech signal in a conference system, or a telephone signal in a car, or the like, disturbed by noise from near or remote noise sources (not shown), picked-up by a microphone 21. The analog reference signal $zz_i$ can be a noise signal from the near or remote noise sources, picked-up by a microphone 22. The noise at the inputs 2 and 3 can be correlated and uncorrelated noise. The adaptive noise cancelling arrangement 1 cancels correlated noise, whereas uncorrelated noise is cancelled by other means, to be described as follows. Particularly in a car, both correlated and uncorrelated noise are present. In the embodiment given, all filtering and other operations are in the digital domain and the noise cancelling arrangement is embodied in a digital signal processor having a processor, RAM and ROM memory, and being suitable programmed. As follows, all signals are assumed to be digital, and, or convenience, the indication 'digital' is omitted when referring to signals. According to the present invention, the adaptive cross-talk filter 13 comprises a pre-filter section 23 for pre-filtering the primary signal $z_0$, and an adaptive filter section 24 for determining coefficients of the pre-filter section 23. An input 25 of the pre-filter section is coupled to the primary signal input 2 and an input 26 is coupled to the signal output 4. The noise cancelling arrangement 1 further comprises a first delay section 27 that is coupled between the primary signal input 2 and the second input 11 of the second subtracter 10, and a second delay section 28 that is coupled between the input 6 of the adaptive noise filter 5 and the adaptive cross-talk filter 13, whereby an output 29 of the second delay section 28 is directly coupled to an input 30 of the adaptive filter section 24. The delay sections 27 and 28 are arranged to delay their input signals over $\Delta$ samples. The adaptive noise filter 5 is referred to by its coefficients $W_i$, the pre-filter section 23 by its coefficients $W_{s,i}$, and the adaptive filter section 24 by its coefficients $W_{sb,i}$. Further shown in FIG. 1 are a desired signal estimate $y_{s,i}$ at the output 15 of the pre-filter 23, an output signal $y_{sb,i}$ at an output 31 of the adaptive filter section 24, and a respective input signal $x_i$ and an output signal $y$ of the adaptive noise filter 5. In the first embodiment, the adaptive filter section 24 is arranged for unconditional transfer of the determined coefficients to the pre-filter section 13. This is because the error signal of $W_{sb,i}$ is calculated using the coefficients of $W_{s,i}$. In the first embodiment, the output signal $y_{sb,i}$ is not calculated so that computational complexity is reduced. In the time domain, the signals are indicated by means of their current sample k between brackets. Because of the use of the pre-filter section 23, the delay sections 27 and 28 may be introduced in the cross-coupled adaptive noise cancelling arrangement 1. Herewith, the output signal $s_0[k]$ becomes available with a delay of $\Delta$ samples. The delayed output signal $s_0[k]$ is used for generating the desired signal estimate $y_{s,i}[k]$. With the delay $\Delta$, the noise filter 5 can approximate a non-causal impulse response. In order not to put constraints on the cross-talk filter 13 as regards possible impulse responses, the delay $\Delta$ is decoupled from the range of impulse responses that can be approximated by the cross-talk filter 13. This is done by splitting the cross-talk filter 13 into the sections 23 and 24, operating on different input signals, the signals $z_0$ and $s_0$, respectively. Herewith, the desired signal filter becomes an adaptive pre-filter, and the adaptation is done using an estimate of the desired signal, namely $s_0$, which, in a stationary state, is a clean signal because of the fact that noise components have already been cancelled. Herewith, it is prevented that the desired signal filters cancel noise components together with cross-talk components.

Figure 2:
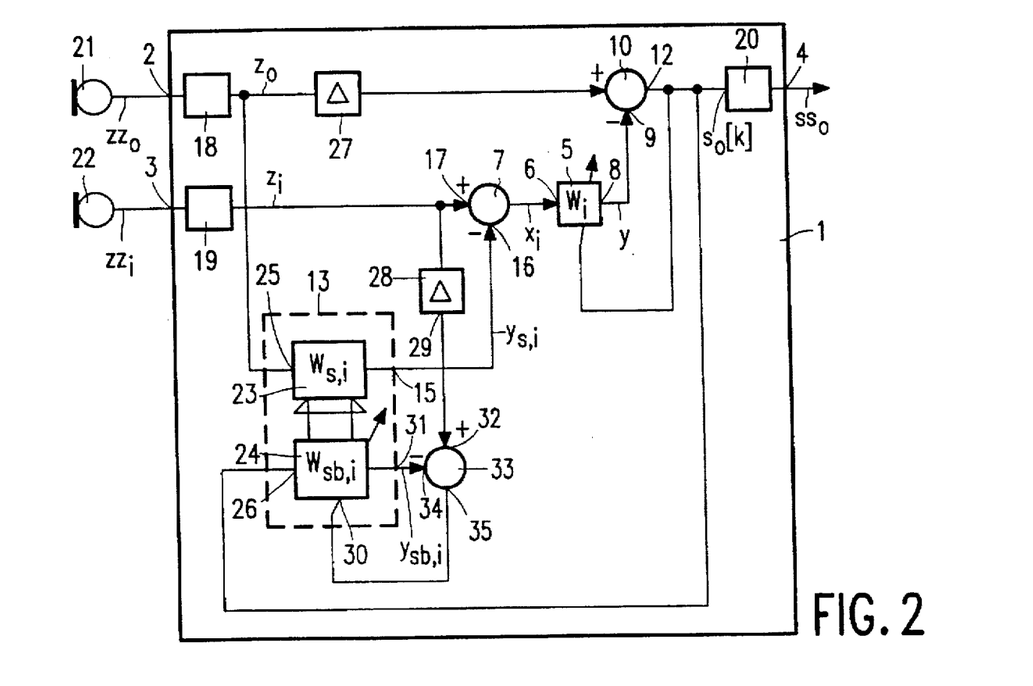
FIG. 2 shows a block diagram of a second embodiment of an adaptive noise cancelling arrangement according to the present invention.

FIG. 2 shows a block diagram of a second embodiment of the adaptive noise cancelling arrangement 1 according to the present invention. Contrary to the first embodiment, in the second embodiment, the adaptation speed of the desired filters is independent of the delay $\Delta$. Herewith, in contrast to the first embodiment, the second embodiment is also stable for larger values of $\Delta$. The second embodiment is thus more suitable for situations in which non-stationary responses occur and for long noise filters, e.g., the acoustic noise cancellation. To make the adaptation speed of the desired filters independent of the delay $\Delta$, the output 29 of the second delay section 28 is coupled to a first input 32 of a third subtracter 33 having a second input 34 coupled to the output 31 of the adaptive filter section 24. An output 35 of the third subtracter 33 is coupled to the input 30 of the adaptive filter section 24. The adaptive filter section 24 is arranged for conditional transfer of determined coefficients to the pre-filter section 23. Herewith, the adaptive filter section 24 and the pre-filter 23 becomes separate filters, the adaptive filter being a background filter, and the pre-filter being a foreground filter.

Figure 3:
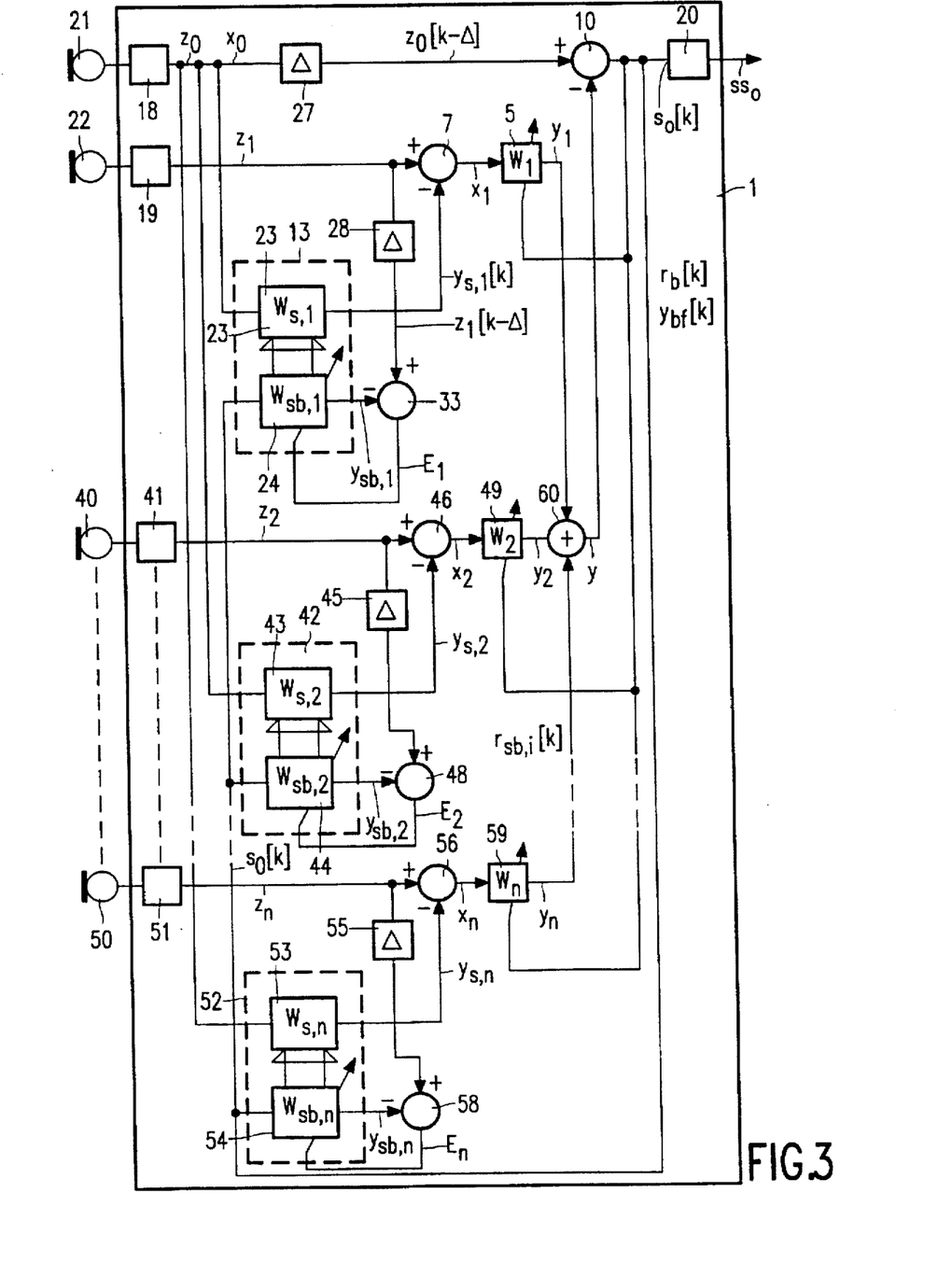
FIG. 3 shows a block diagram of a third embodiment of an adaptive noise cancelling arrangement according to the present invention.

FIG. 3 shows a block diagram of a third embodiment of the adaptive noise cancelling arrangement 1 according to the present invention. Shown is a multiple-reference-input configuration with pre-filtered adaptive noise cancelling, as according to the second embodiment described for a single-reference-input. Such a configuration is particularly useful for acoustic noise cancellation in a typical office room, or the like, the desired signal being a speech signal. Instead of signal-index I, the signals in the respective cancellation branches are indicated with indices 1, 2, ..., n, n being an integer. In an embodiment with four closely spaced microphones, n=3. In branch-1, for the various blocks, the same reference numerals are used, but the signals are indicated with reference-1, and so on. For reference-2, similar blocks and signals are shown as for reference-1, namely, the signals $x_2$, $y_{s,2}$, $y_{sb,2}$, and $z_2$, and a microphone 40, and analog-to-digital converter 41, and adaptive cross-talk filter 42 having a pre-filter section 43 and an adaptive filter section 44, a delay section 45, a subtracter 46, a subtracter 48, and an adaptive noise filter 49. For reference-n, e.g., n=3, similar blocks and signals are shown as for reference-1, namely, the signals $x_n$, $y_{s,n}$, $y_{sb,n}$, and $z_n$, and a microphone 50, an analog-to-digital converter 51, an adaptive cross-talk filter 52 having a pre-filter section 53 and an adaptive filter section 54, a delay section 55, a subtracter 56, a subtracter 58, and an adaptive noise filter 59. Respective output signals $y_1$, $y_2$, and $y_n$ are added by means of an adder 60 so as to form the signal y. In an application like acoustic noise cancellation in a typical office room with remote noise sources, the adaptive noise filters 5, 49, and 59 are required to cover a time window that is a significant fraction of a reverberation time of such a room, the reverberation time being defined as a reverberant sound field to decays by, for example, 60 dB. It has been found that for a room with a reverberation time of 0.5 sec and at a sampling rate of 8 kHz, adaptive noise filters having 1024 taps achieve approximately 15 dB noise cancellation. In an embodiment, the adaptive noise filters are implemented as frequency-domain adaptive filters in a foreground-background configuration as described. In acoustic noise cancellation, the cross-talk filters 13, 42, and 52 are much shorter. This is because the cross-talk components are generated by a speaker at near distance to the closely-spaced microphones. In an embodiment, the cross-talk filters 13, 42, and 52 are implemented as normalized LMS (Least-Mean-Square) adaptive filters.

Figure 4:
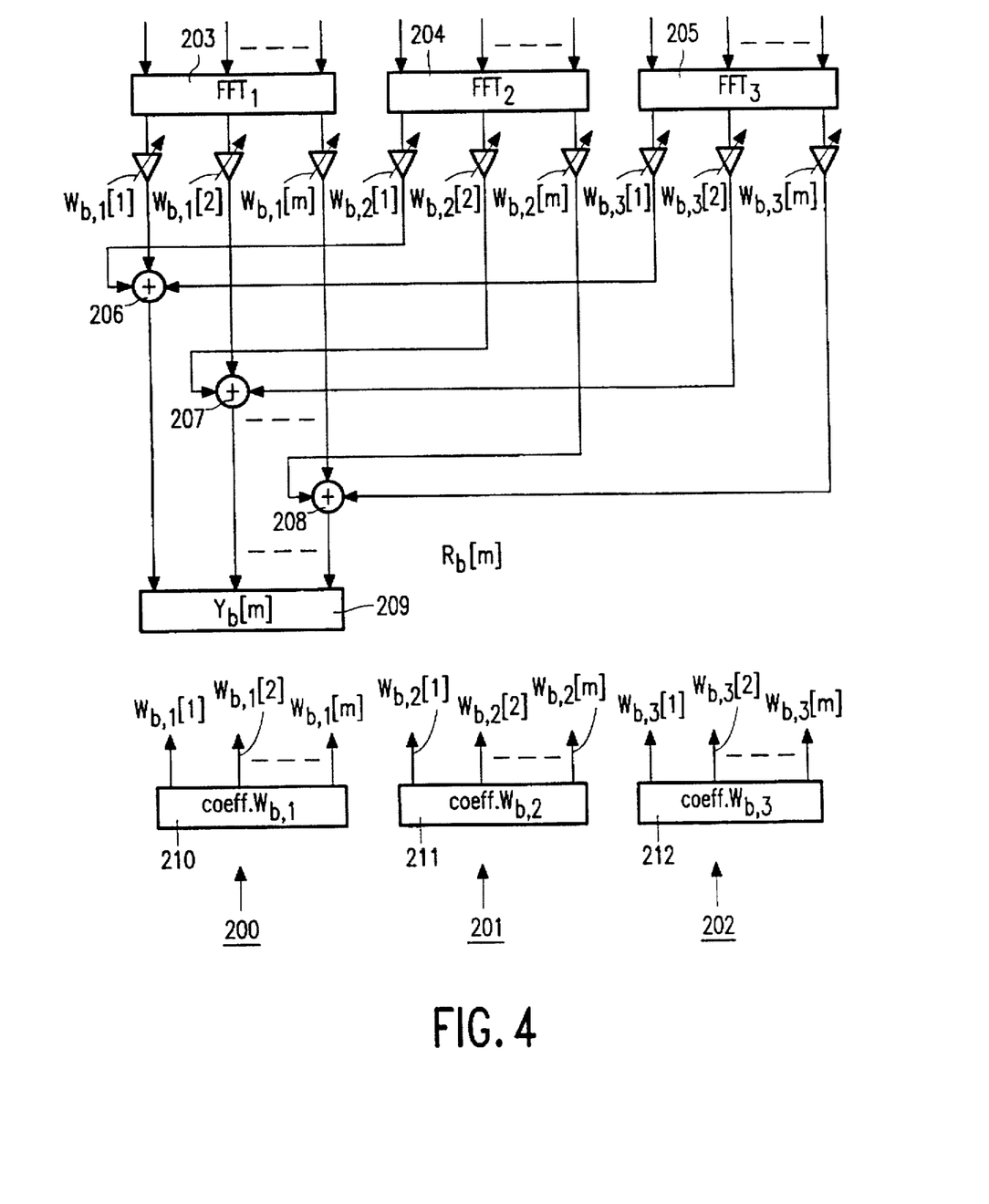
FIG. 4 shows background frequency domain adaptive noise filters.
Figure 5:
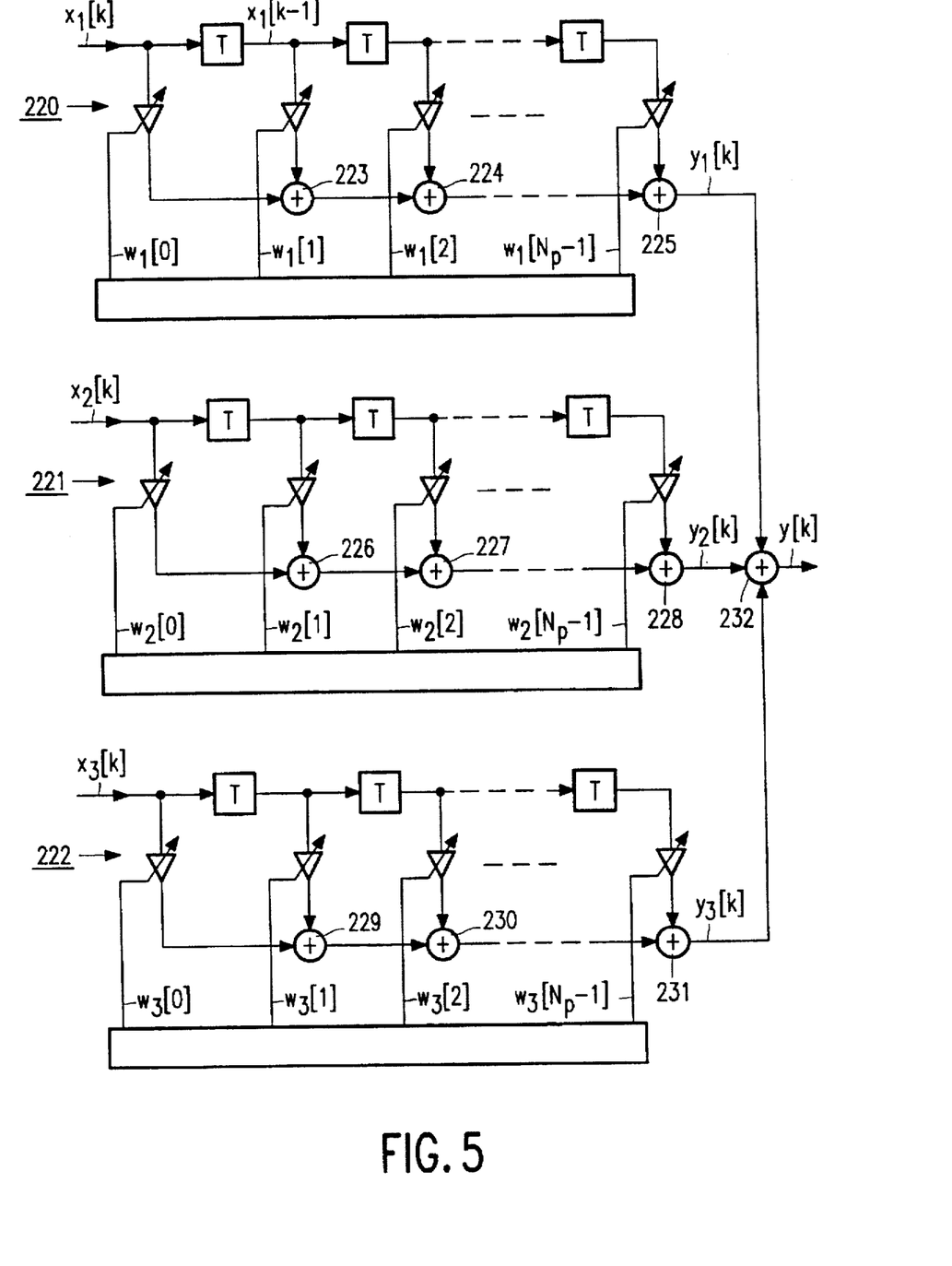
FIG. 5 shows a foreground time domain programmable noise filter.

For acoustic noise cancellation, in FIGS. 4 and 5, the filters in the embodiment as shown in FIG. 3 will now be described, the adaptive noise filters 5, 49 and 59 being the same, as well as the adaptive cross-talk filters 13, 42 and 52. In the embodiment given, n=3. The three noise filters 5, 49 and 59 are long filters that cancel noise in the adaptive noise cancelling arrangement 1, and have background frequency domain filters 200, 201 and 202 as shown in FIG. 4, and foreground time domain filters 220, 221 and 222 as shown in FIG. 5, filters 200 and 220 forming the filter $W_1$, the filters 201 and 221 forming the filter $W_2$, and the filters 201 and 22 forming the filter $W_3$. The foreground cross-talk filters $W_{s,1}$, $W_{s,2}$ and $W_{s,3}$ have similar structures as the foreground noise filters, but are shorter and are not shown in detail. The background adaptive cross-talk filters $W_{sb,1}$, $W_{sb,2}$ and $W_{sb,3}$ are described in the form of LMS-update formula for updating the foreground cross-talk filters. The digital signal processor is suitable programmed to implement such LMS-formula and to implement updating. Frequency domain coefficients are indicated with big letters and time domain coefficients are indicated with small letters.

FIG. 4 shows the background frequency domain adaptive noise filters 200, 201 and 202. The background filters are N-tap frequency-domain adaptive filters, each filter operating on blocks of L samples, N and L being integers. In an embodiment, the frequency domain adaptive filter length N=2048 and the block length L=2048. Once every L samples, the most recent samples of the inputs $x_1[k]$, $x_2[k]$ and $x_3[k]$ are transformed to the frequency domain by means of discrete Fourier Transform $FFT_1$, $FFT_2$ and $FFT_3$. A frequency domain output $Y_b[m]$ is calculated, using complex background filter coefficients $W_{b,1}$, $W_{b,2}$ and $W_{b,3}$:

$$Y_{b(l)[m]} = \Sigma_l W_{b,l}[l][m].X_l[l][m] \quad (1)$$

l and an index m being integers, l=1, 2 and 3, and the index b denoting background filtering. Shown are FFT-blocks 203, 204 and 205 of which outputs are weighted. Respective weighted outputs are respectively added with adders 206, 207 and 208. An output register 209 contains the output $Y_b[m]$. Further shown are coefficient registers 210, 211 and 212. The frequency domain output $Y_b[l][m]$ is transformed back to the time domain using a discrete Inverse Fourier Transform so as to produce L samples at an output of the adder 60, and output signal $y_{bf}[k]$ in which the first N samples on the left are discarded. A residual signal $r_b[k]$ is formed by the digital signal processor, $r_b[k]=x_0[k-\Delta]-y_{bf}[k]$ padded with zeroes on the left so as to get a block of N+L samples. The padded residual signal $r_b[k]$ is Fourier transformed to the frequency domain to produce a residual frequency domain signal $R_b[m]$ that is used to update the complex background filter coefficients $W_{b,i}$ in accordance with a complex LMS (Least Mean Square) algorithm:

$$W_{b,l}[l][m+1] = W_{b,l}[l][m] + 2\mu[l][m]R_b[l][m](X_l[l][m])^* \quad (2)$$

* denoting a complex conjugate operation, and µ being an update constant. The complex background filter coefficients $W_{b,i}$ are inverse Fourier transformed to the time domain and truncated to a time domain programmed filter length of $N_p$ samples. The thus obtained $N_p$ samples are copied in the foreground filters $W_1$, $W_2$ and $W_3$. In an embodiment, $N_p=N$. No adaptation is done when a desired signal such as a speech signal is present. Such a condition can be detected from the output power. Coefficients are transferred when the background output power is smaller than the foreground output power of the filters. This is a condition in which the background filter coefficients give rise to a better noise cancellation.

FIG. 5 shows the foreground time domain programmable noise filters 220, 221 and 222, being $N_p$-tap filters, $N_p$ being an integer. Identical delay blocks T are shown. The input signals $x_1$, $x_2$ and $x_3$ are weighted with the shown weighting factors $w_1[0]$, $w_2[0]$ and $w_3[0]$, respectively, and added with delayed versions of the input signals in the respective adders 223, 224 and 225, the adders 226, 227 and 228, and the adders 229, 230 and 231. The output signal y[k] is an output signal of an adder 232 that adds the signals $y_1[k]$, $y_2[k]$ and $y_3[k]$.

The three cross-talk filters 13, 42 and 52 include the short pre-filters 23, 43 and 53, and the adaptive filter sections 24, 44 and 54, the pre-filters cancelling the cross-talk in the pre-filtered adaptive noise canceller 1 as applied to acoustic noise cancellation. The pre-filter coefficients are updated under the condition that no speech is present. The pre-filters 23, 43 and 53 generate cross-talk estimates $y_{s,i}[k]$ from the primary input signal $z_0[k]$ using three $N_{p,3}$-tap filters having a similar structure to the foreground noise filters 220, 221 and 221 according to the time domain filtering operation:

$$y_{s,i}[k] = \Sigma_n w_{s,i}[n][k]z_3[k-n] \quad (3)$$

I=1, 2 and 3, and n=0, 1, 2, ..., $N_{p,s}-1$. In an embodiment, $N_{p,s}=64$.

The $N_{p,3}$-tap filters are not shown in detail.

The estimates $y_{s,i}[k]$ are subtracted from the reference input signals $z_i[k]$ so as to generate the signals $x_i[k]$:

$$x_i[k] = z_i[k] - y_{s,i}[k] \quad (4)$$

Herewith, in the foreground, the noise estimate signal y[k] appears at the output of the adder 60 according to $y[k]=\Sigma_i y_i[k]$ and:

$$y_i[k] = \Sigma_n w_i[n][k]x_i[k-n] \quad (5)$$

n=0, 1, ..., $N_p-1$. In an embodiment $N_p=N$. The filter is implemented using the structure described in FIG. 5. The estimate y[k] is subtracted from the delayed primary input $z_0[k-\Delta]$ so as to produce the output signal $s_0[k]=z_0[k-\Delta]-y[k]$. The background adaptive filter sections 24, 44 and 54 $w_{sb,i}$ are adapted so as to de-correlate respective error signals $\epsilon_1$, $\epsilon_2$ and $\epsilon_3$ at outputs of the subtracters 33, 48 and 58, calculated from the delayed input signals $z_i[k-\Delta]$ and the respective output signals $y_{sb,i}[k]$ of the adaptive filter sections 24, 44 and 54, from their common input signal $s_0[k]$. The background output signals $y_{sb,i}[k]$ are:

$$y_{sb,i}[k] = \Sigma_n w_{sb,i}[n][k]x_3[k-n] \quad (6)$$

n=0, 1, 2, ..., $N_{p,s}-1$. The background error signals $r_{sb,i}[k]$ are:

$$r_{sb,i} = z_i[k-\Delta] - y_{sb,i}[k] \quad (7)$$

The adaptive filter sections 24, 44 and 54 are updated by means of an LMS-update:

$$w_{sb,i}[n][k] = w_{sb,i}[n][k-1] + 2\mu_3[k]r_{sb,i}[k]x_{sb}[k-n] \quad (8)$$

The above LMS-update is appropriately normalized so as to make the adaptation speed independent of the level of the desired signal, the update constant $\mu_s$ being a function of a desired signal power estimate and the filter length $N_{p,s}$, the power estimate being determined by first order filtering of the delayed primary input signal $z_0[k-\Delta]$. A conditional transfer of filter coefficients from the background filters 24, 44 and 54 to the foreground pre-filters 23, 43 and 53 is done in accordance with a transfer variable $t_s[k]$: If $t_s[k]=1$: a background-to-foreground update is done:

$$w_{s,i}[n][k+1] = w_{sb,i}[n][k] \quad (9)$$

If $t_s[k]=0$: a foreground update is done:

$$w_{s,i}[n][k+1] = w_{s,i}[n][k] \quad (10)$$

With a filter length $N_{p,s}=64$ as regards prior art noise cancellation, a 8–10 dB better cross-talk cancellation was found.

Figure 6:
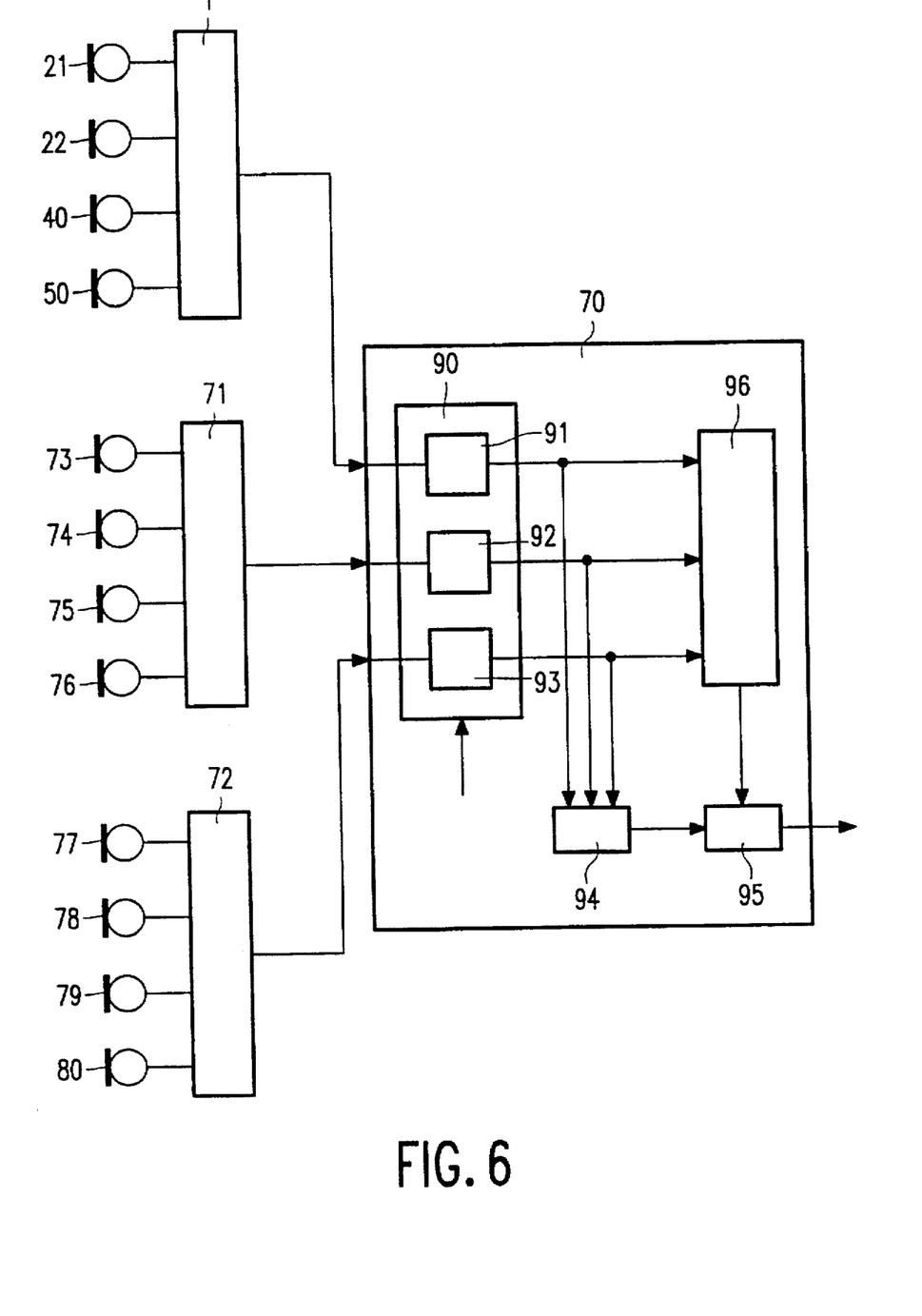
FIG. 6 shows a block diagram of a series arrangement combination of an adaptive noise cancelling arrangement according to the present invention and a Zelinski-spectral subtraction noise reduction arrangement.

FIG. 6 shows a block diagram of a series arrangement combination of an adaptive noise cancelling arrangement 1 according to the present invention and a Zelinski-spectral subtraction noise reduction arrangement 70. Such a combined noise cancelling configuration is particularly useful for hands-free telephone applications in cars, because both correlated and uncorrelated noise is substantially cancelled. In FIG. 6, further adaptive noise cancelling arrangements 71 and 72 are shown having a similar configuration as the embodiment shown in FIG. 3. The noise cancelling arrangement 71 has four microphones 73, 74, 75, and 76, and the noise cancelling arrangement 72 has four microphones 77, 78, 79, and 80, the Zelinski-spectral subtraction noise reduction arrangement advantageously has a structure as described in the PCT Application WO 95/16259, corresponding to U.S. Pat. No. 5,610,991, the contents of which is herewith incorporated by reference. In the configuration shown in FIG. 6, in the arrangements 1, 71, and 72, a digital-to-analog converter 20 can be dispensed with, the Zelinski-spectral subtraction arrangement 20 being implemented in the digital domain. The arrangement 20, as described in the PCT Application WO 95/16259, comprises delay compensation means 90 having adjustable delay compensation sections 91, 92, and 93 for time-aligning output signals of the arrangements 1, 71, and 72. Time-aligned signals are fed to an adder 94 coupled to an adaptive Wiener filter 95. A Wiener filter update block 96 is used applying a modified Zelinski update algorithm as disclosed in said WO 95/16259. In WO 95/16259, a spectral subtraction is carried out on a combined cross spectrum of cross spectra for each input signal. Then, on a speech-segment-by-speech-segment basis, filter coefficients for the Wiener filter 95 are determined from a combined auto power spectrum and the combined cross power spectrum. The spectral subtraction is carried out on a lower part of the frequency range where correlated noise components are present.

Figure 7:
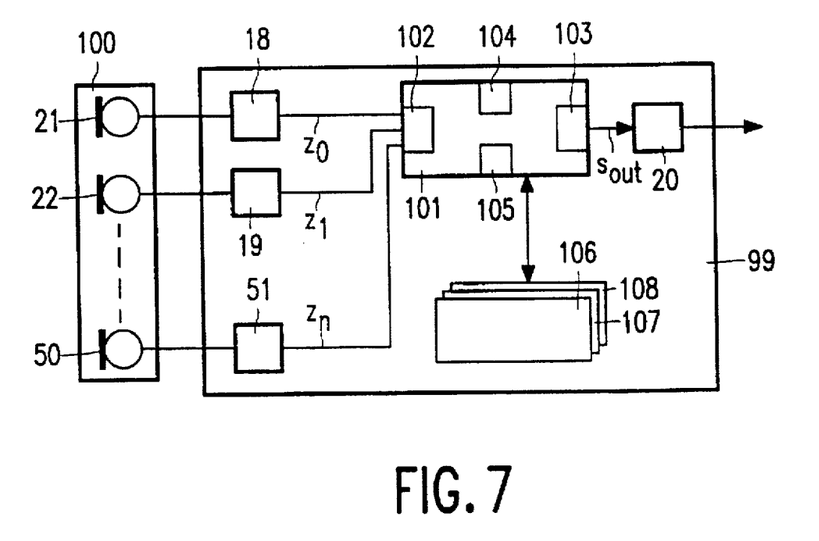
FIG. 7 shows an embodiment of a noise reduction system according to the present invention.

FIG. 7 shows an embodiment of a noise reduction system 99 according to the present invention comprising a microphone array 100 with the microphones 21, 23, . . . , 50. The noise cancelling arrangement 1 comprises a microcontroller 101 having an input interface 102 for inputting the output signals $z_0, z_1, \ldots, z_n$ from the analog-to-digital converters 18, 19, . . . , 51, an output interface 103 for outputting a digital signal $s_{out}$ to the digital-to-analog converter 20, a RAM memory 104 and a ROM memory 105. At least one digital signal processor 106 is coupled to the microcontroller 101, but the signal processing load can be shared by further digital signal processors 107 and 108. The microcontroller 101 is suitable programmed to control analog-to-digital input/output operations, and vice versa, and to control the digital signal processors 106, 107, and 108. In this embodiment, the noise reduction as described in FIG. 6 is implemented, the digital signal processors 106, 107 and 108 sharing the computational load for carrying out the adaptive noise cancellation and the Zelinski-spectral subtraction noise reduction according to the present invention. The digital-to-analog converter 20 converts the digital output signal $s_{out}$ with reduced correlated and reduced uncorrelated noise. Such a noise reduction system 99 can be applied for hands-free telephones, for instance.

Figure 8:
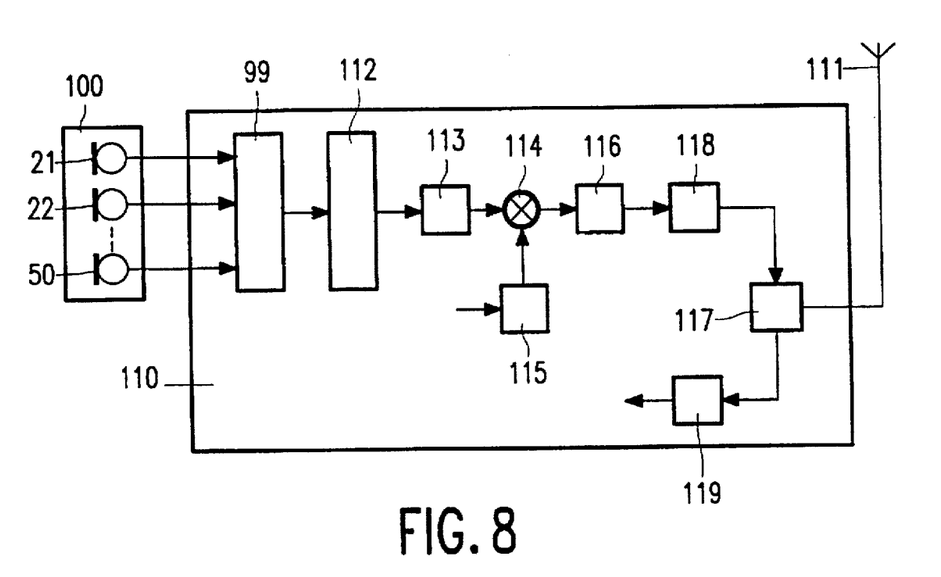
FIG. 8 shows a transceiver with a noise reduction system according to the present invention.

FIG. 8 shows a transceiver 110 including an adaptive noise cancelling arrangement 1 according to the present invention. The transceiver can be a cordless telephone transceiver, a cellular car phone, or the like. The transceiver 110 is coupled to the microphone array 100 and to a transmit/receive antenna 111. The transceiver 110 further comprises a baseband processor 112 that is coupled to the noise reduction system 99, and further, a modulator 113 for modulating a baseband processed signal. At the output side, the modulator 113 is coupled to a mixer 114. The mixer is coupled with an input to a local oscillator 115 and with an output to a radio frequency power amplifier 116 that is coupled to a duplexer 117 via a transmit front-end 118. The duplexer 118 is further coupled to a receive front-end 119. Further transceiver circuitry is not shown in detail. The transceiver 110 can be a DECT (Digital European Cordless Telecommunications) transceiver, a GSM (Global System for Mobile Communications) transceiver, or any other suitable transceiver. The noise reduction system 99 can also be a separate system that can be coupled between the microphone array 100 and a microphone input of a conventional transceiver.

Figure 9:
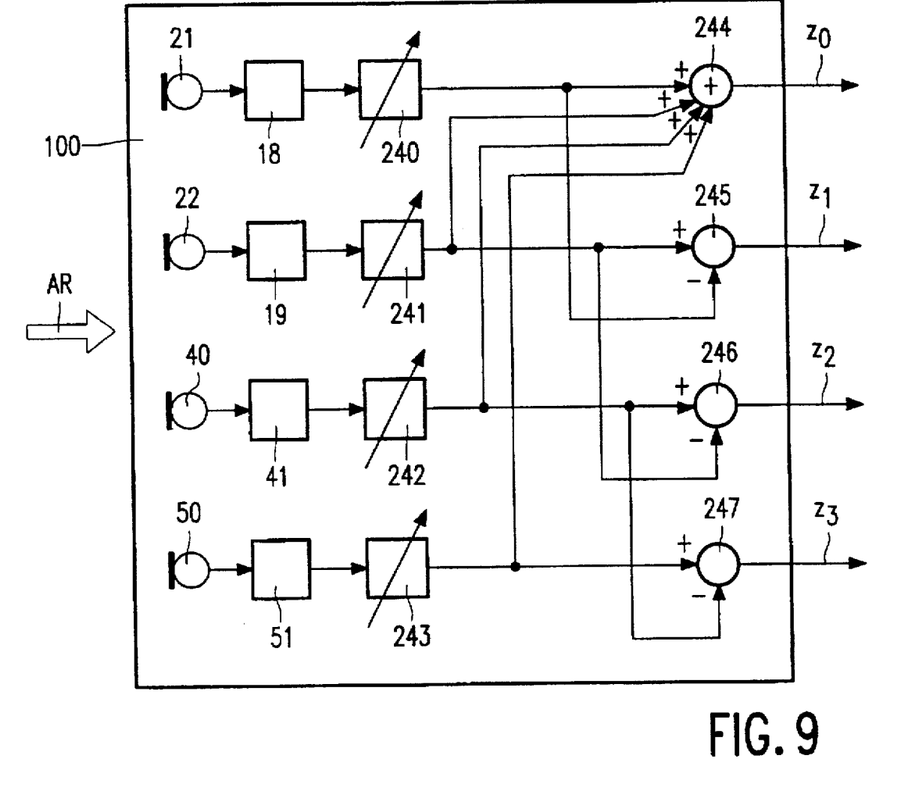
FIG. 9 shows a first microphone array configuration.

FIG. 9 shows a first microphone array configuration of the microphone array 100. In this embodiment, the array is a spatially linear configuration, and the microphones 21, 22, 40 and 50 are not necessarily directional. The microphones are in line and pointed to a speaker (not shown), an arrow AR indicating a direction pointing away from the speaker. The microphone array 100 comprises a cascade of the microphone 21, the analog-to-digital converter 18, an adjustable delay 240 and tan adder 244 for the primary signal $z_0$, and respective cascades of the microphones 22, 40 and 50, the analog-to-digital converters 19, 41 and 51, adjustable delays 241, 242 and 243 and subtracters 245, 246 and 247 for the respective reference signals $z_1$, $z_2$ and $z_3$. Outputs of the adjustable delays 240, 241, 242 and 243 are added in the adder 244. The subtracter 245 subtracts an output signal of the adjustable delay 240 from an output signal of the adjustable delay 241, the subtracter 246 subtracts the output signal from the adjustable delay 241 from an output signal of the adjustable delay 242, and the subtracter 247 subtracts the output signal of the adjustable delay 242 from an output signal of the adjustable delay 243. The adjustable delays 240, 241, 242 and 243 are adjusted such that at the outputs the sampled microphone signals are phase aligned.

Figure 10:
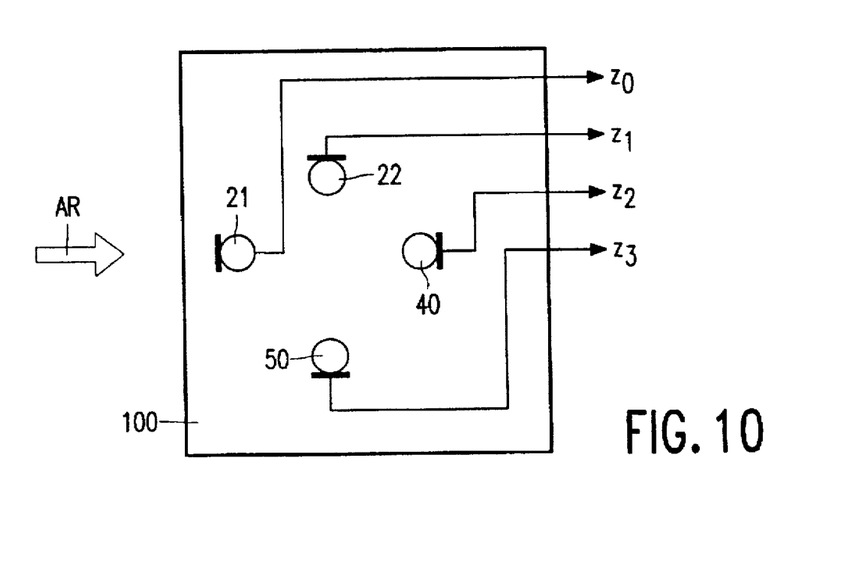
FIG. 10 shows a second microphone array configuration.

FIG. 10 shows a second microphone array configuration of the microphone array 100. In this embodiment, the microphones 21, 22, 40 and 50 are directional microphones and the array is a spatially cross-configuration in which the microphone 21 is directed to the speaker.

We claim:

1. An adaptive noise cancelling arrangement for cancelling noise in a noise disturbed signal, said adaptive noise cancelling arrangement comprising:

a primary signal input for receiving a primary signal which is disturbed with noise;

at least one reference signal input;

a signal output for providing a noise cancelled signal;

a first subtracter having a first input coupled to the reference signal input;

an adaptive noise filter having an input coupled to to an output of the first subtracter;

a second subtracter having a first input coupled to an output of the adaptive noise filter, a second input coupled to the primary signal input, and an output coupled to the signal output; and an adaptive cross-talk filter having an input coupled to the signal output, and an output coupled to a second input of the first subtracter, characterised in that the adaptive cross-talk filter comprises a pre-filter section for pre-filtering the primary signal, and an adaptive filter section for determining coefficients of the pre-filter section, an input of the pre-filter section being coupled to the primary signal input, and an input of the adaptive filter section being coupled to the signal output, the adaptive noise cancelling arrangement further comprising a first delay section and second delay section, the first delay section being coupled between the primary signal input and the second input of the second subtracter, and the second delay section being coupled between the input of the adaptive noise filter and a further input of the adaptive cross-talk filter.

2. An adaptive noise cancelling arrangement according to claim 1, wherein an output of the second delay section is directly coupled to an input of the adaptive filter section of the adaptive cross-talk filter, and the adaptive filter section is arranged for unconditional transfer of the determined coefficients to the pre-filter section of the adaptive cross-talk filter.

3. An adaptive noise cancelling arrangement according to claim 1, wherein the adaptive noise cancelling arrangement further comprises a third subtracter having a first input coupled to the output of the second delay section, a second input coupled to an output of the adaptive filter section of the adaptive cross-talk filter, and an output coupled to the input of the adaptive filter section of the adaptive cross-talk filter, the adaptive filter section being arranged for conditional transfer of the determined coefficients to the pre-filter section of the adaptive cross-talk filter.

4. An adaptive noise cancelling arrangement according to claim 1, wherein the adaptive noise cancelling arrangement comprises further reference signal inputs and further adaptive noise filters having inputs coupled, respectively, to the further reference signal inputs; an adder having inputs coupled, respectively, to outputs of the adaptive noise filter and the further adaptive noise filters, and an output coupled to the signal output, the noise cancellation arrangement further comprising further adaptive cross-talk filters arranged, respectively, for said further reference signals as the adaptive cross-talk filter is arranged for said reference signal.

5. An adaptive noise cancelling system comprising a series arrangement of a Zelinski noise reduction arrangement, or a Zelinski-spectral subtraction noise reduction arrangement, and an adaptive noise cancelling arrangement as claimed in claim 1.

6. An adaptive noise cancelling arrangement according to claim 1, wherein said adaptive noise cancelling arrangement further comprises at least two closely-spaced microphones coupled to respective analog-to-digital converters for providing sampled microphone signals forming said primary signal and said reference signal, and at least one digital signal processor, and wherein the at least one digital signal processor is programmed to implement the adaptive noise filter, the adaptive cross-talk filter, the first and second subtracters, and the first and second delay sections.

7. An adaptive noise cancelling arrangement as claimed in claim 6, wherein the adaptive noise filter has a length substantially greater than a length of the adaptive cross-talk filter.

8. An adaptive noise cancelling arrangement as claimed in claim 6, wherein the closely spaced microphones are configured in a spatially linear configuration, said adaptive noise cancelling arrangement further comprising a pre-processing arrangement for the microphone signals, the pre-processing arrangement comprising a cascade of first delay adjustment means and an adder in the primary signal path, and a cascade of second delay adjustment means and a subtracter in the reference signal path, the adder adding output signals of the first delay adjustment means, and the subtracter subtracting a delayed primary signal from a delayed reference signal.

9. An adaptive noise cancelling arrangement as claimed in claim 6, wherein the closely-spaced microphones are configured in a spatially cross-configuration, the microphones being directional microphones.

10. A transceiver comprising a baseband processor, modulating means, mixing means in a transmit path and a transmit/receive antenna, and a receive path, the transceiver further comprising an adaptive noise cancelling arrangement as claimed in claim 1, coupled to an input of the baseband processor.

* * * * *